July 14, 1931.  H. W. O'DOWD  1,814,491
THERMOSTATIC FUEL CONTROLLING DEVICE
Filed June 8, 1928  2 Sheets-Sheet 2
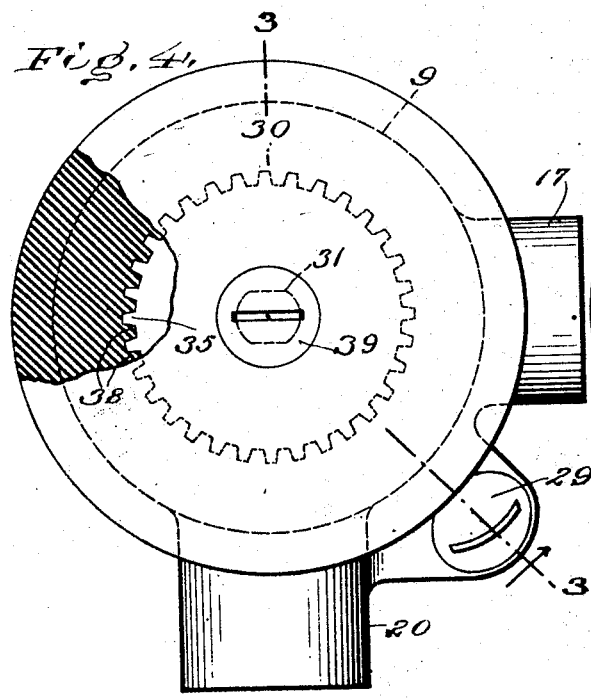
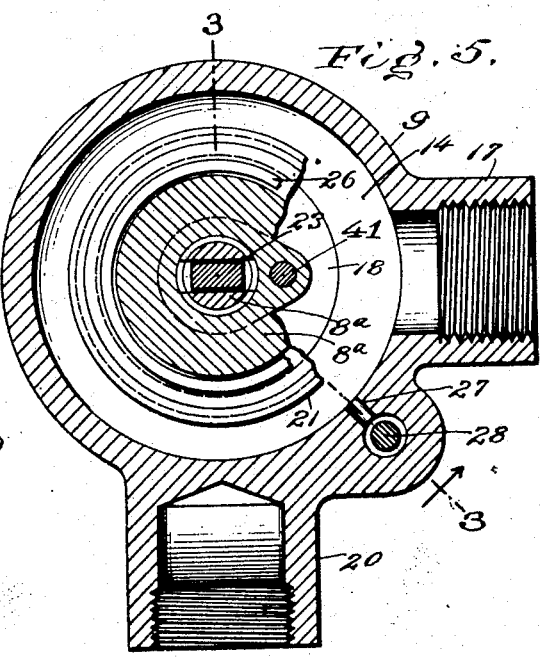
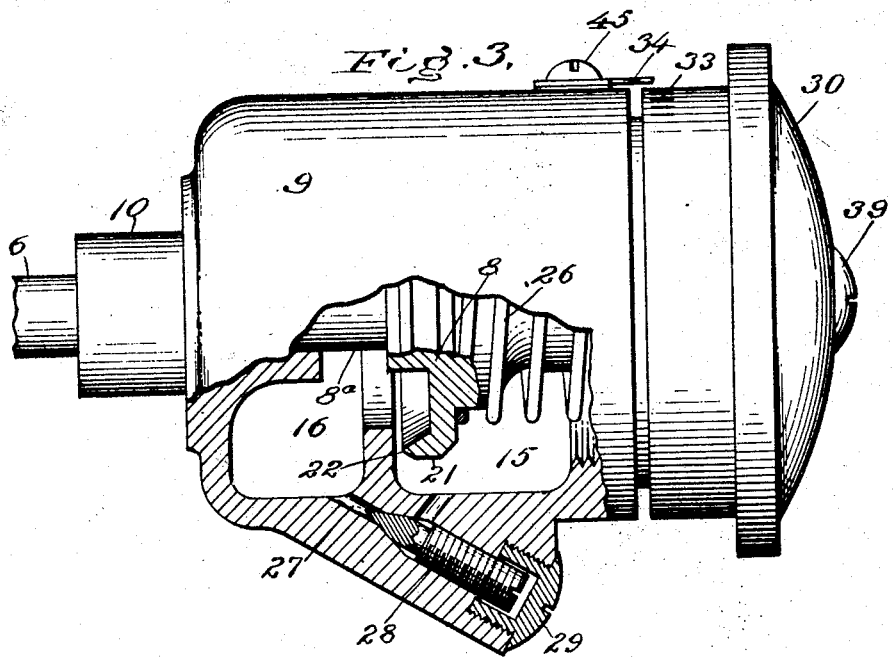
INVENTOR
Henry W. O'Dowd
BY
ATTORNEYS Patented July 14, 1931

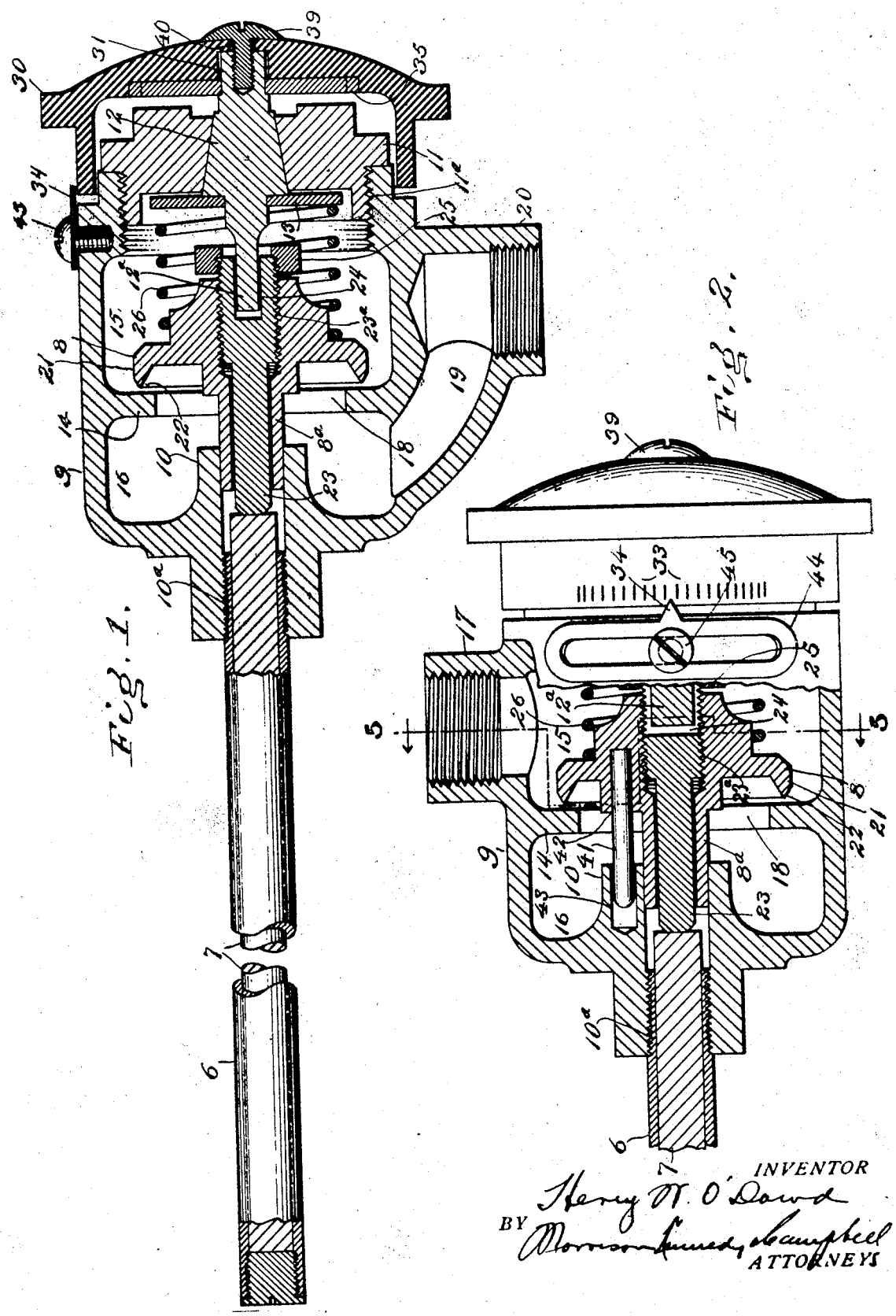

1,814,491

UNITED STATES PATENT OFFICE

HENRY W. O'DOWD, OF JERSEY CITY, NEW JERSEY, ASSIGNOR TO STANDARD GAS EQUIPMENT CORPORATION, A CORPORATION OF MARYLAND

THERMOSTATIC FUEL CONTROLLING DEVICE

Application filed June 8, 1928. Serial No. 283,809.

This invention relates to thermostatically operated fuel controlling devices, and has reference more particularly to devices of this kind suitable for use in connection with ovens or other heating chambers of gas stoves to regulate the heat thereof.

Various devices of this character have been presented to the art but the several types are defective in some important respect, in that either they are complicated in mechanism, inaccurate and unreliable, sluggish in action, or otherwise lacking. With these defects of the art in view, therefore, the present invention contemplates generally providing a device of this kind which shall be of simple construction, involving a minimum of parts; which shall be highly sensitive in action and capable of responding promptly to slight changes in temperature; which shall be positive and uniform in operation; which can be readily and conveniently adjusted to vary the degree of the controlled temperature, and which can be easily and quickly assembled and disassembled. These and other objects of the invention will be more fully set forth in the following description.

In the accompanying drawings:

Fig. 1 is a sectional view showing parts of a thermostatic controlling device constructed in accordance with the invention;

Fig. 2 is a section taken in a plane at right angles to that of Fig. 1;

Fig. 3 is a side elevation of the valve casing shown in Fig. 2, parts being broken away and shown in section on the line 3—3 of Figs. 4 and 5;

Fig. 4 is a front or end view of the improved device, parts being broken away; and Fig. 5 is a cross section taken thru the device as viewed from the front.

Referring to the drawings in detail, the improved thermostatic fuel controlling device of the invention is shown as including a thermostatic element or couple which may be of any suitable form and construction, but as shown, comprises an external tube 6 of a metal having a relatively high coefficient of expansion, such as copper, and an internal rod 7 fixed at its inner end to the tube and composed of a material having a low coefficient of expansion, such as invar or stoic material or the like. This thermostatic couple is located in the stove in any desired relation to the ovens or other heating chambers thereof. For example, it may be located directly in the oven or in the top flue of the oven, or elsewhere. As usual, the oven is heated by a gas burner, these parts not being shown, and the gas supplied to the burner under control of the thermostatic device.

The quantity of gas fed to the burner is regulated by a valve 8, later to be described in more detail, housed in a valve casing 9 of generally cylindrical shape and usually disposed horizontally, as in Fig. 1, and which is formed at its rear end with a hollow axial boss 10 adapted to extend thru the side of the oven structure for attachment thereto. At its outer end, the boss 10 is internally screw threaded, as at 10$^a$, to receive the threaded end of the tube 6 of the thermostatic couple. The front end or head of the valve casing is formed by a plug 11, which is screwed into the cylindrical body of the casing, as at 11$^a$ (see Fig. 1), and which when removed permits the valve and other interiorly located parts to be easily and quickly inserted in or removed from the casing. A tapered or cone-shaped hub 12 facing outwardly from the casing is rotatably mounted in a corresponding cone-shaped bearing opening in the plug 11, and is provided with an inwardly extending rectangular stem 12$^a$, around the base of which is mounted on the plug a washer 13 spaced slightly from the inner face of the plug 11. Further reference will be made to these parts. The valve casing 9 is divided by a partition wall 14 into gas inlet and outlet chambers 15 and 16, respectively, the gas entering the valve casing from the supply pipe above referred to thru a radial hollow boss 17 communicating with the inlet chamber 15, and which is screw threaded to receive said supply pipe, see Figs. 2 and 5, and the gas then flowing from the inlet chamber into the outlet chamber thru a suitable orifice or port 18 in said partition wall. From the gas outlet chamber 16, communication is established with the oven burner thru a gas outlet 19 (see Fig. 1)

formed in the casing and leading from the chamber 16 to a hollow radial internally threaded boss 20 provided at the lower side of the casing and adapted to receive a gas pipe leading to the oven burner, said pipe and burner not being shown.

Communication between the gas inlet chamber and the outlet chamber is controlled and regulated by the above mentioned valve 8, which preferably is of the poppet type, see Figs. 1 and 2, and which has an annular flange 21 formed with a knife edge 22, adapted to seat upon the partition wall 14 and make a gas-tight connection therewith. By the movement of the valve to and from its seat, it will be seen that the flow of the gas thru the port 18 and so thru the casing is properly governed. As a convenient means of supporting and guiding the valve in its movements, it is formed with a rearwardly extending shank 8$^a$ slidably arranged in an inward extension of the boss 10, see Figs. 1 and 2. While the valve may be made of any suitable material, it is preferably formed of brass which can be worked with ease, speed, and accuracy.

The valve 8 with its shank 8$^a$ is formed with a central bore to receive a spindle 23 which projects beyond both ends thereof. The spindle at its rear end contacts with the rod 7 of the thermostatic couple and is made of a hard metal to resist wear, such as cold rolled steel, which also has a low coefficient of expansion. At its front end, the spindle is slightly enlarged and is screw threaded to the valve 8, as at 23$^a$. At its forward end, the spindle is also formed with a rectangular recess 24 in which closely fits the stem 12$^a$ of the rotatable hub 12, before referred to; and surrounding the head of the spindle and having a screw threaded engagement therewith, is a ferrule ring 25. Engaged with the body of the valve 8 is a spring 26 of suitable strength, one end thereof bearing upon the flange 21 of the valve and the other end bearing against the washer 13.

With the parts as thus arranged, it will be seen that, as the temperature falls in the oven or other compartment of the gas stove in which the thermostatic couple is located, the rod 7, due to the contraction of the copper tube 6, will be pushed forwardly. The rod 7 in turn will push forwardly the spindle 8$^b$ and thereby move the valve 8 away from its seat against the opposition of the spring 26, permitting the flow of fuel or gas thru the port 18 and on to the burner. Conversely, as the temperature within the oven or other compartment of the stove rises, the rod 7 will be drawn rearwardly by the expansion of the tube 6 and allow the spring 26 to move the valve 8 toward its seat to reduce the flow of gas or to cut it off entirely. It is also pointed out that the spring 26 by bearing against the washer 13 performs the further and important office of keeping the rotary hub 12 in gas-tight connection with the plug 11.

It may be noted at this point that, as best shown in Fig. 3, the gas is allowed to flow from the inlet or gas receiving chamber 15 to the outlet chamber 16 thru a by-pass opening 27 formed in the valve casing, this opening being controlled by a throttling valve in the form of an adjustable end pointed screw 28 which is covered by a cap screw 29. The purpose of this arrangement of parts is to insure that the oven will be supplied with a minimum amount of gas continuously and independently of that controlled by the thermostatic valve, and this in order to prevent the supply of gas from being cut off entirely from the burners by the action of the valve. It is also the purpose of this arrangement to supply gas to a pilot burner, not shown, when the oven is in use.

It is essential that the valve be capable of adjustment relatively to the thermostatic couple in order to vary the temperature of the oven according to the nature of the requirements of the articles being heated. This adjustment is effected, in the present instance, by means of an adjusting dial wheel 30 which is attached to a stem or stud 31 projecting forwardly from the tapered hub 12, above referred to. At its rear and larger end, the hub 12 projects a short distance beyond the inner face of the plug 11 to provide a shoulder for the washer 13, and beyond this point the rectangular stem 12$^a$ above referred to extends rearwardly from the hub and is slidingly fitted in the rectangular recess 24 formed in the forward end of the valve spindle 23 as heretofore described, so that by turning the dial wheel the valve may be adjusted without breaking its connection with the adjusting wheel.

The dial wheel 30 is provided on its periphery with graduations 33 which are adapted to be read in connection with a pointer 34 which will presently be described. Instead of being rigid with the hub stem 31, the dial wheel is adapted to be attached thereto in such manner as to admit of the adjustment of the wheel circumferentially relatively to the stem in the direction of the spacing of the graduations, and this for the purpose of enabling the parts to be set in their proper relative positions during assemblage, to meet the varying conditions encountered in practice in respect to the different thermal values and the different pressures which the gas possesses in different localities. In the present instance, this adjustment is effected by means of a toothed disk or gear wheel 35, see Figs. 1 and 4, formed with a central slot which receives the rectangular extremity of the stem 31, so that when the disk is turned, it will impart a turning movement to the stem and the parts connected therewith. The inner face of the dial wheel has a circular recess to receive the disk, see Fig. 1, and the peripheral wall of the recess is formed with teeth 38 adapted to engage between the teeth on the disk and thereby interlock the wheel with the disk, the wheel being held in place, with the two sets of teeth detachably interlocked, by means of a screw stud 39 extending thru a hole 40 in the wheel and screwed into the outer end of the stem or stud 31, the head of the screw bearing against the outer face of the wheel. By this method of mounting the dial wheel, it can be adjusted circumferentially in the direction of the spacing of the graduations relative to the stem operated thereby, by first loosening the screw stud sufficiently to disengage the teeth, then shifting the head around to the desired position, and again engaging the teeth and screwing up the stud to maintain the parts in their adjusted position. By such treatment of the dial wheel, the graduations on the wheel may be caused when positioned opposite the pointer 34 to indicate the actual temperature required under any given conditions.

The valve 8 is prevented from rotating with the dial wheel and valve spindle 23 by a pin 41, see Fig. 2, secured in a hole 42 formed in the body of the valve and slidably arranged in an aligned hole 43 formed in the boss 10. The hole 43 is made of such length with relation to the pin 41 as to permit of the necessary reciprocation of the valve 8 in moving to and from its seat. It will be noted that as the valve is held from rotating with spindle 23 it will, when the latter is rotated by the dial wheel, be forced to travel upon the spindle toward or from its seat depending upon the direction of rotation of the dial wheel and the spindle. In this connection, it may be noted that the ferrule ring 25 will prevent any excess or overthrow movement of the valve adjusting spindle 23.

Referring to the pointer 34 (Figs. 1 and 2), this member forms part of a slotted slide member 44 connected to the upper side of the valve casing by a stud screw 45. As will be understood, in any given locality the condition of the gas or the pressure may cause fluctuations in the actual temperature of the oven notwithstanding the initial adjustment already described, and any such additional adjustment as may be necessary can be easily and quickly made by simply adjusting the slide member 44 toward the right or left, as the case may be.

In the foregoing description and accompanying drawings the invention has been set forth in the particular detailed form which it is preferred to adopt, but it will be manifest that the details may be variously changed and modified without departing from the spirit of the invention. It should be understood, therefore, that the invention is not limited to any particular form or construction of the parts, except insofar as such limitations are specified in the claims.

I claim;

1. In or for a thermostatic fuel controlling device, the combination of a valve casing divided into inner and outer chambers for the fuel by a partition wall extending radially inwardly from the side walls of the casing, said chambers being wholly offset axially from each other, said partition wall being formed with an aperture therein for the passage of the fuel, a valve arranged in one of said chambers and adapted to be seated upon said partition wall, a rotatable adjusting member mounted gas-tight in a bearing opening in the outer wall of the casing, and a spring arranged to bear at one end against the valve and at the other end against the adjusting member, said valve comprising a body portion with a central threaded bore, and a screw-threaded valve adjusting spindle mounted in said bore and arranged to contact with the thermostat rod and slidably but non-rotatably connected to the rotatable adjusting member, a dial wheel connected with said adjusting member exteriorly of the valve casing to rotate the same, and means for preventing the valve body from rotating with the spindle.

2. In or for a thermostatic fuel controlling device, the combination of a valve casing divided into inner and outer chambers for the fuel by a partition wall extending radially inwardly from the side walls of the casing, said chambers being wholly offset axially from each other, said partition wall being formed with an aperture therethrough for the passage of the fuel, a valve arranged in one of said chambers and adapted to be seated upon said partition wall, a rotatable adjusting member connected to the valve and mounted gas tight in a bearing opening in the outer wall of the casing, and a spring arranged to bear at one end against said valve and at the other end against said valve adjusting member.

In testimony whereof, I have affixed my signature hereto.

HENRY W. O'DOWD.